United States Patent
Janiczek

(10) Patent No.: US 12,380,409 B2
(45) Date of Patent: Aug. 5, 2025

(54) METHODS AND SYSTEMS FOR EXPLOITING VALUE IN CERTAIN DOMAINS

(71) Applicant: Flourish Worldwide, LLC, Denver, CO (US)

(72) Inventor: Joseph Janiczek, Denver, CO (US)

(*) Notice: Subject to any disclaimer, the term of this patent is extended or adjusted under 35 U.S.C. 154(b) by 0 days.

(21) Appl. No.: 17/886,343

(22) Filed: Aug. 11, 2022

(65) Prior Publication Data
US 2023/0177471 A1 Jun. 8, 2023

Related U.S. Application Data

(63) Continuation of application No. 17/492,003, filed on Oct. 1, 2021, now Pat. No. 11,443,286.

(51) Int. Cl.
*G06Q 10/1093* (2023.01)
*G06N 20/00* (2019.01)

(52) U.S. Cl.
CPC ......... *G06Q 10/1097* (2013.01); *G06N 20/00* (2019.01)

(58) Field of Classification Search
CPC . G06Q 10/1093; G06Q 10/0631; G06N 20/00
USPC .......... 705/7.21, 7.24, 7.22, 7.27, 7.12, 7.11, 705/7.13, 7.16
See application file for complete search history.

(56) References Cited

U.S. PATENT DOCUMENTS

| | | | | |
|---|---|---|---|---|
| 7,967,731 B2 * | 6/2011 | Kil | .......................... | G16H 20/30 482/901 |
| 9,202,111 B2 * | 12/2015 | Arnold | ............... | G06Q 10/0639 |
| 10,176,463 B2 * | 1/2019 | Abebe | ................ | G06Q 10/1095 |
| 10,311,694 B2 | 6/2019 | McIntosh et al. | | |
| 10,791,930 B2 | 10/2020 | Soyao et al. | | |
| 10,997,566 B2 * | 5/2021 | Barnes | ..................... | G06N 5/02 |

(Continued)

FOREIGN PATENT DOCUMENTS

| WO | 2020074577 | 4/2020 |
|---|---|---|
| WO | 2020237048 | 11/2020 |

(Continued)

OTHER PUBLICATIONS

Reflectly APS, The Done App, Dec. 31, 2021.

*Primary Examiner* — Rutao Wu
*Assistant Examiner* — Letoria G Knight
(74) *Attorney, Agent, or Firm* — Caldwell Intellectual Property Law

(57) ABSTRACT

Aspects relate to methods and systems for exploiting value within certain domains. An exemplary method includes interrogating, using a remote device, a user for scheduling data and at least a domain, wherein the at least a domain includes at least one domain and no more than a predetermined maximum number of domains, receiving, using the remote device, the at least a domain from the user, interrogating, using the remote device, the user for domain-specific data associated with the at least a domain, receiving, using the remote device, the domain-specific data from the user, generating, using a computing device, a domain target for the at least a domain as a function of the domain-specific data, generating, using the computing device, a user schedule as a function of the domain target and the scheduling data, and displaying, using the remote device, the user schedule and the domain target to the user.

20 Claims, 12 Drawing Sheets

(56) References Cited

U.S. PATENT DOCUMENTS

| | | | |
|---|---|---|---|
| 11,017,688 B1 | 5/2021 | Arazi | |
| 11,177,038 B2 * | 11/2021 | Sanders | A63B 24/0062 |
| 11,228,810 B1 * | 1/2022 | Arazi | H04N 21/6582 |
| 11,790,293 B2 * | 10/2023 | Liu | G06Q 50/26 |
| | | | 705/7.16 |
| 2003/0204412 A1 | 10/2003 | Brier | |
| 2009/0049447 A1 | 2/2009 | Parker | |
| 2015/0364057 A1 * | 12/2015 | Catani | G16H 10/60 |
| | | | 434/262 |
| 2017/0147775 A1 | 5/2017 | Ohnemus et al. | |
| 2018/0011978 A1 | 1/2018 | Reeckmann | |
| 2018/0314963 A1 * | 11/2018 | Kovács | G06F 18/2185 |
| 2018/0349489 A1 * | 12/2018 | Toudji | G06F 16/313 |
| 2019/0034494 A1 | 1/2019 | Bradley et al. | |
| 2020/0005928 A1 | 1/2020 | Daniel | |
| 2020/0250508 A1 * | 8/2020 | De Magalhaes | G06N 3/006 |
| 2020/0320894 A1 | 10/2020 | Davidson et al. | |
| 2021/0049503 A1 * | 2/2021 | Nourian | G06F 11/3466 |
| 2021/0050086 A1 | 2/2021 | Rose et al. | |
| 2021/0073293 A1 * | 3/2021 | Fenton | H04L 51/08 |
| 2021/0104173 A1 | 4/2021 | Pauley et al. | |
| 2021/0326788 A1 * | 10/2021 | Liu | G06N 20/00 |
| 2022/0016480 A1 * | 1/2022 | Bissonnette | A63B 24/0062 |
| 2022/0027783 A1 * | 1/2022 | Neumann | G16H 10/60 |
| 2022/0391768 A1 * | 12/2022 | Li | G06N 3/047 |
| 2023/0140828 A1 * | 5/2023 | Durvasula | G06N 5/046 |
| | | | 705/7.37 |

FOREIGN PATENT DOCUMENTS

| | | |
|---|---|---|
| WO | 2021087320 | 5/2021 |
| WO | WO-2023033790 A1 * | 3/2023 |

* cited by examiner

| Vocational 204 | Marriage 208 | Family 212 |
| --- | --- | --- |
| Health 216 | Virtue 220 | Emotional 224 |
| Financial 228 | Spiritual 232 | Intellectual 236 |
| Lifestyle 240 | Interest 244 | Social 248 |

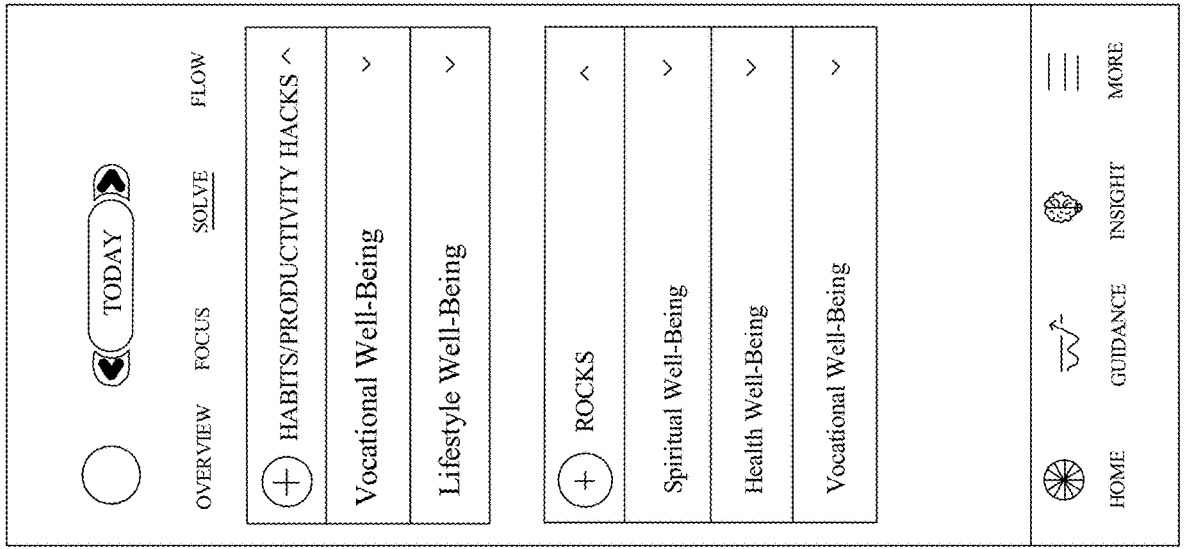

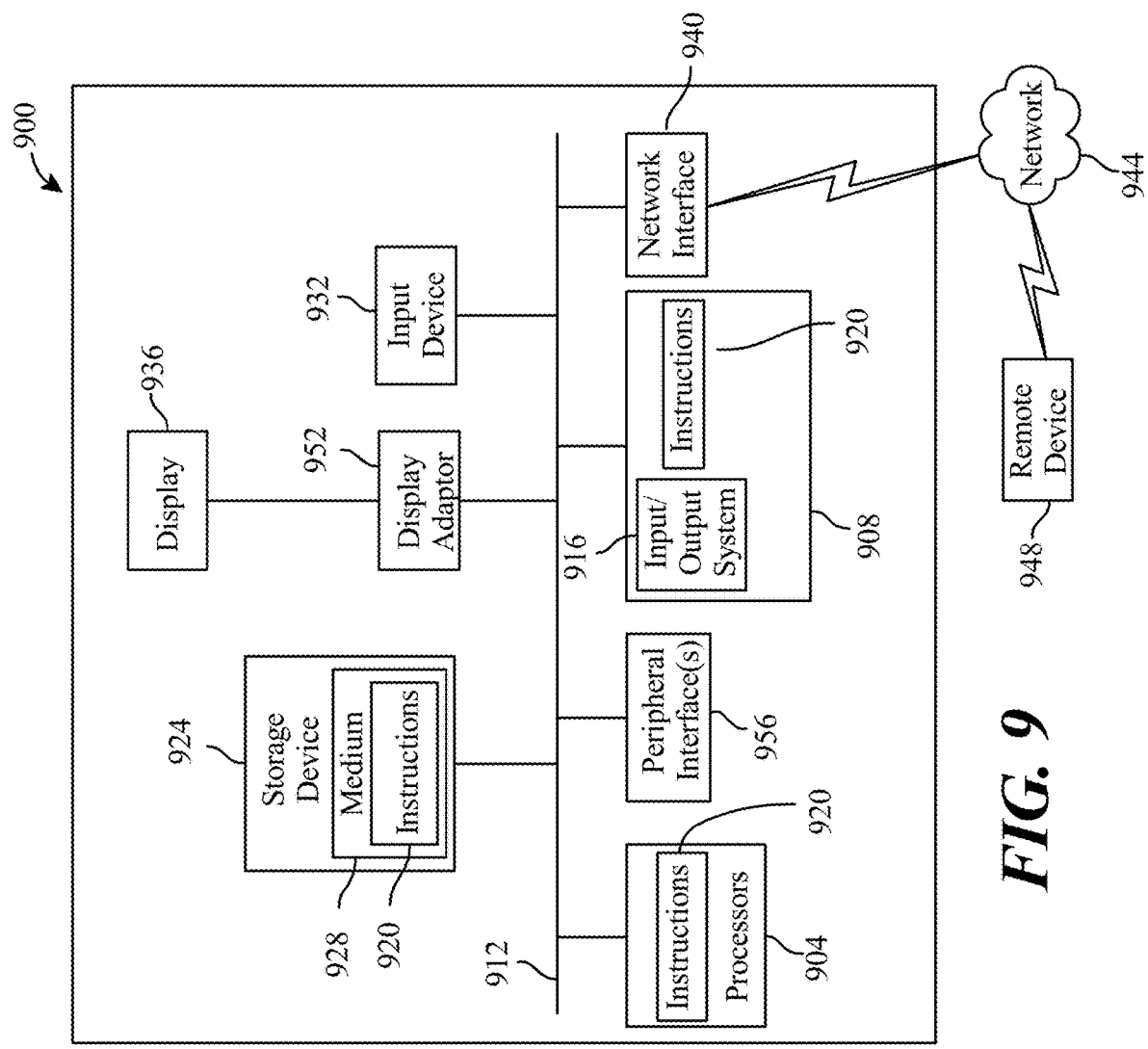

METHODS AND SYSTEMS FOR EXPLOITING VALUE IN CERTAIN DOMAINS

CROSS-REFERENCE TO RELATED APPLICATIONS

This application is a continuation of Nonprovisional application Ser. No. 17/492,003 filed on Oct. 1, 2021 and entitled "METHODS AND SYSTEMS FOR EXPLOITING VALUE IN CERTAIN DOMAINS" the entirety of which is incorporated herein by reference.

FIELD OF THE INVENTION

The present invention generally relates to the field of AI & Simulation/Modeling. In particular, the present invention is directed to methods and systems for exploiting value in certain domains.

BACKGROUND

Many domains are present within which users are desirous of exploiting maximum value. However, user schedules are a finite-resource. A user often must handle priorities and/or conflicts with multiple life realms outside these closed or limited systems.

SUMMARY OF THE DISCLOSURE

In an aspect, a method of exploiting value within a certain domain, the method including interrogating, by a computing device, a remote device associated with a user for scheduling data, at least a domain, and domain-specific data, wherein the domain-specific data is a function of the at least a domain. The method also including receiving, by the computing device and from the remote device, the scheduling data, the at least a domain, and the domain-specific data. The method also including generating, by the computing device, at least a domain target for the at least a domain as a function of the domain-specific data. The method further including generating, by the computing device, at least a user schedule as a function of the at least a domain target and the scheduling data, wherein generating the at least a user schedule includes receiving a status of the at least a domain, assigning one or more state variables to the at least a domain, wherein the one or more state variables represent the status of the at least a domain, and generating the at least a user schedule as a function of the one or more state variables. The method further including displaying, by the computing device and at the remote device, the at least a user schedule and the at least a domain target to the user.

In another aspect, a system for exploiting value within a certain domain, the system including a computing device configured to interrogate a remote device associated with a user for scheduling data, at least a domain, and domain-specific data, wherein the domain-specific data is a function of the at least a domain. The computing device further configured to receive, from the remote device, the scheduling data, the at least a domain, and the domain specific data. The computing device further configured to generate, by the computing device, at least a user schedule as a function of the at least a domain target and the scheduling data, wherein generating the at least a user schedule includes receiving a status of the at least a domain, assigning one or more state variables to the at least a domain, wherein the one or more state variables represent the status of the at least a domain, and generating the at least a user schedule as a function of the one or more state variables. The computing device further configured to display, at the remote device, the at least a user schedule and the at least a domain target to the user.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 2 is a table illustrating exemplary domains;

FIG. 3C is an exemplary remote device including an exemplary graphical user interface;

FIG. 9 is a block diagram of a computing system that can be used to implement any one or more of the methodologies disclosed herein and any one or more portions thereof.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for exploiting value in certain domains. In an embodiment, a user may select certain domains that are preferential for exploitation. The present disclosure represents a practical application of exploiting value in certain domains, in part, by allowing users to automatically have targets for domains and schedules generated. Additionally, the disclosure teaches an improvement of present computing systems as these automated task may be performed on a device other than the user's local device allowing access to larger computing powers and higher levels of automation.

Aspects of the present disclosure can be used to set targets to achieve with respect to certain domains. Aspects of the present disclosure can also be used to schedule plans in order to progress toward achievement of targets. This is so, at least in part, because in some embodiments schedules may be generated as a function of domain targets.

Aspects of the present disclosure allow for improving status within one or more domains. Exemplary embodiments illustrating aspects of the present disclosure are described below in the context of several specific examples.

Figure 1:
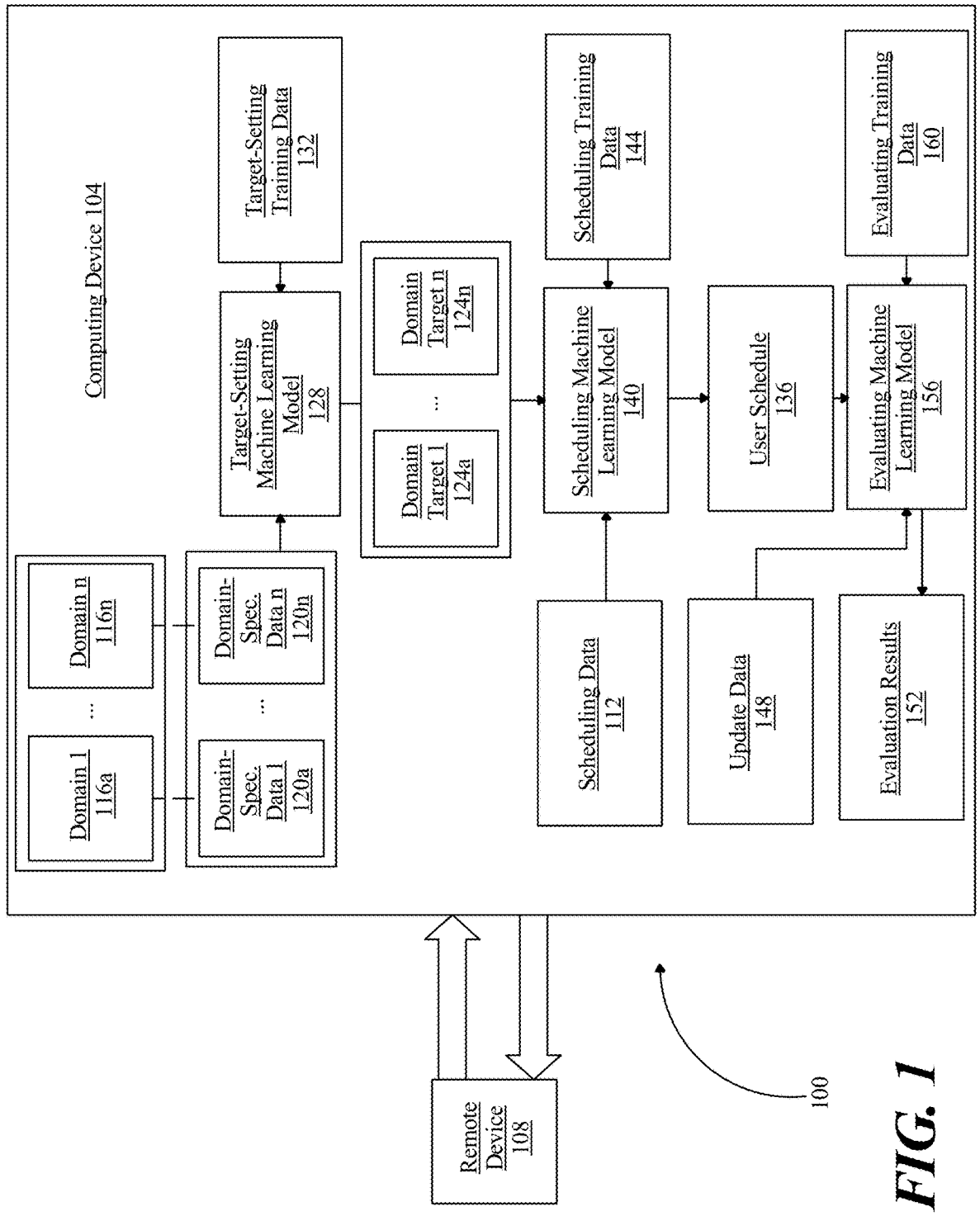
FIG. 1 is a block diagram illustrating an exemplary system for exploiting value in certain domains.

Referring now to FIG. 1, an exemplary embodiment of a system 100 for exploiting value in certain domains is illustrated. System includes a computing device 104. Computing device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, system 100 may include a remote device 108. As used in this disclosure, a "remote device" is a computing device that is remote to another computing device. In some cases, a remote device 108 may be in communication with computing device 104 for example by way of one or more networks. One or more networks may include any network described in this disclosure, for instance networks described in reference to FIG. 9. In some cases, remote device 108 may include a personal computing device, such as without limitation a smart phone, a tablet, a desktop, a laptop, or the like.

With continued reference to FIG. 1, system 100 may interrogate a user for user data. "Interrogating," as used in this disclosure, is an act of prompting for a response. In some cases, interrogating may include displaying multiple prompts, such as without limitation fields, drop-down boxes, check boxes, radio switches, and the like. In some cases, interrogating may be performed according to a set of prompts, for instance as with a questionnaire. "User data," as used in this disclosure, is any data that is associated with user. In some cases, user data may include scheduling data 112. As used in this disclosure, "scheduling data" is information associated with a schedule. For instance scheduling data may include days and times which a user is busy or free. In some cases, scheduling data may include calendar data, such as without limitation an Outlook calendar file, a Google calendar file, an Apple calendar file, and the like. In some cases, scheduling data may include an invite, for example an Outlook invite. In some cases, scheduling data may include temporal data (i.e., when), spatial data (i.e., where), personnel data (i.e., with whom), and the like.

With continued reference to FIG. 1, user data may include at least a domain 116a-n. As used in this disclosure, a "domain" is an area of a user's life. Exemplary non-limiting domains include vocational domain, marriage domain, family domain, health domain, virtue domain, emotional domain, financial domain, spiritual domain, intellectual domain, lifestyle domain, interest domain, and social domain. Domain may include any domain described in this disclosure, including those described with reference to FIG. 2.

With continued reference to FIG. 1, computing device 104 may receive user data, such as one or more of scheduling data 112 and at least a domain 116a-n from user by way of remote device 108. Alternatively or additionally, computing device 104 may receive user data from a third party on a remote device 108 and/or a local device 104. In some cases, at least a domain 116a-n may include at least one domain 116a and no more than a predetermined maximum number of domains. As used in this disclosure, a "predetermined maximum number of domains" is a high threshold which a user may select for exploitation. In some cases, predetermined maximum number of domains may be within a range of 1 and 15, for instance 10, 5, 4, 3, 2, or 1.

With continued reference to FIG. 1, system 100 may interrogate user for additional user data, including for example domain-specific data 120a-n as a function of at least a domain 116a-n. In some cases, each element of domain-specific data 120a-n may be associated with a domain of at least a domain 116a-n. As used in this disclosure, "domain-specific data" is information that is associated with a domain. Exemplary domain-specific data is described below with reference to twelve separate domains in FIG. 2. Domain-specific data may be evidential and associated with a user's current status within a domain. Alternatively or additionally, domain-specific data may be aspiration and associated with a user's desired status within a domain.

With continued reference to FIG. 1, system 100 may generate at least a domain target 124a-n for at least a domain 116a-n, for example by using computing device 104. As used in this disclosure, a "domain target" is a goal associated with a domain. In some cases, system 100 may generate at least a domain target 124a-n as a function of domain-specific data 120a-n. In some cases, each domain target of at least a domain target 124a-n may be associated with a domain of at least a domain 116a-n. In some embodiments, at least a domain target 124a-n includes a quarterly target. As used in this disclosure, a "quarterly target" is a goal that may be strived for within a quarter of a year. In some cases, a quarterly target may represent a longer-term goal or progression than can normally be achieved within a shorter schedule, such as week or a month. In some embodiments, at least a domain target 124a-n includes a yearly target. As used in this disclosure, a "yearly target" is a goal that may be strived for within a year. In some cases, a yearly target may represent a longer-term goal or progression than can normally be achieved within a shorter schedule, such as week or a month. In some embodiments, at least a domain target 124a-n includes a five-year target. As used in this disclosure, a "five-year target" is a goal that may be strived for within a five-year period. In some cases, a five-year target may represent a longer-term goal or progression than can normally be achieved within a shorter schedule, such as week or a month. In some cases, system 100 may generate at least a domain target 124a-n by using a machine learning process, for example a target-setting machine learning model 128. Target-setting machine learning model 128 may including any machine learning process described in this disclosure, including those described with reference to FIGS. 4-7. In some cases, target-setting machine learning model 128 may include a classifier, such as any classifier described in this disclosure, for example with reference to FIG. 7.

Still referring to FIG. 1, in some embodiments, target-setting machine learning model 128 may receive input including domain-specific data 120a-n. As used in this disclosure, a "target-setting machine learning model" is a machine learning process that takes as input user data, such as domain-specific data, and generates at least a domain target. Target-setting machine learning model 128 may generate at least a domain target 124a-n as a function of domain-specific data 120a-n. In some embodiments, system 100 may train target-setting machine learning model 128. In some cases, target-setting training data 132 may be input into a machine learning algorithm. Machine learning algorithm may include any machine learning algorithm described in this disclosure, including those referenced in FIGS. 4-7. As used in this disclosure, "target-setting training data" is a dataset that includes a plurality of domain-specific data correlated to a domain target. Domain-specific data and domain targets may be entered into target-setting training data manually, for example by a domain expert. In some cases, domain-specific data and domain targets may be derived for publications associated with a particular domain. Domain-specific data and domain targets may be derived from earlier instances of the system 100 or the system's operation with other users or with a same user associated with a different domain. System 100 may train target-setting machine learning model 128 as a function of machine-learning algorithm and/or target-setting training data 132.

With continued reference to FIG. 1, system 100 may generate a user schedule 136, for example by using computing device 104. As used in this disclosure, a "user schedule" is a list of planned events with corresponding dates and times for a user. In some cases, system 100 may generate user schedule 136 as a function of one or more of at least a domain target 124a-n and scheduling data 112. In some embodiments, at least a user schedule 136 may include a daily schedule. In some cases, a daily schedule may include events or activities which are intended to help a user progress (and ultimately flourish) within at least a domain 116a-n. As used in this disclosure, a "daily schedule" is a schedule that spans a day, i.e., 24 hours. In some embodiments, at least a user schedule 136 may include a weekly schedule. As used in this disclosure, a "weekly schedule" is a schedule that spans a week, i.e., seven days. In some embodiments, at least a user schedule 136 may include a monthly schedule. As used in this disclosure, a "monthly schedule" is a schedule that spans a month, i.e., 29, 28, 30, or 31 days. In some cases, a monthly schedule may include events or activities which are intended to help a user progress (and ultimately flourish) within at least a domain 116a-n. In some cases, system 100 may generate user schedule 136 by using a machine learning process, for example a scheduling machine learning model 140. Scheduling machine learning model 140 may including any machine learning process described in this disclosure, including those described with reference to FIGS. 4-7. In some cases, scheduling machine learning model 140 may include a neural network, such as neural networks described in this disclosure, for example with reference to FIGS. 5-6.

Still referring to FIG. 1, in some embodiments, scheduling machine learning model 140 may receive input including one or more of at least a domain target 124a-n and scheduling data 112. As used in this disclosure, a "scheduling machine learning model" is a machine-learning process that that takes as input one or more of at least a domain target and user data, such as scheduling data, and generates at least a domain target. System 100 may generate at least a user schedule 136 as a function of scheduling machine learning model 140. In some embodiments, system 100 may train scheduling machine learning model 140. In some cases, training scheduling machine learning model 140 may include inputting scheduling training data 144 to a machine learning algorithm. As used in this disclosure, "scheduling training data" is a dataset that includes a plurality of domain targets correlated to schedule components. Domain targets and schedule components may be entered into scheduling training data manually, for example by a domain expert. In some cases, domain targets and scheduling components may be derived for publications associated with a particular domain. Domain targets and scheduling components may be derived from earlier instances of the system 100 or the system's operation with other users or with a same user associated with a different domain. Machine learning algorithm may include any machine learning algorithm described in this disclosure, for example those described with reference to FIGS. 4-7. As used in this disclosure, a "schedule component" is information that includes event data and temporal data. A schedule component may be included in a schedule. A schedule component may include a location. An exemplary schedule component is "kettle-bell workout, duration of 30 min, located at gym." System 100 may train scheduling machine learning model 140 as a function of machine-learning algorithm. In some cases, scheduling machine learning model 140 may be a function of one or more automated planning and scheduling algorithms. Additionally disclosure related to automated planning and scheduling algorithms may be found with reference to FIG. 4.

With continued reference to FIG. 1, system 100 may display one or more of at least a user schedule 136 and at least a domain target 124a-n user, for example by way of remote device 108. In some cases, remote device 108 may display to user by way of a graphical user interface (GUI). GUI may be presented to user as part of an application operating upon remote device. GUI may include text and graphics intended to communicate information as well as prompts and interfaces with which as user may input information. An exemplary GUI is illustrated in FIG. 3.

Still referring to FIG. 1, in some embodiments, system 100 may interrogate user for update data 148, for example by using remote device. As used in this disclosure, "update data" is information derived or received from user after generation of one or more of at least a user schedule and at least a domain target. In some cases, update data may be useful in determining a user's adherence to a user schedule or progress toward a domain target. In some cases, system 100 may receive update data 148 automatically, for example without knowledge of user. For example, in some cases, update data 148 may be ascertained from data detectable by remote device, e.g., location data, screen time, application time, and the like. In some cases, update data 148 may include objective update data 148. As used in this disclosure, "objective update data" is update data that is objective in quality, for example amount of time a user spent undertaking an event on user schedule. In some cases, update data 148 may include subjective update data 148. As used in this disclosure, "subjective update data" is update data that is subjective in quality, for example how a user rates changes to her social life may be subjective update data relating to a social domain.

Still referring to FIG. 1, in some embodiments, system 100 may evaluate update data 148 as a function user schedule 136 and/or domain target 124a-n, for example using computing device 104. Evaluating update data 148 may yield evaluation results 152. As used in this disclosure, "evaluation results" are information originating from evaluation of update data. In some cases, system 100 may display evaluation results 152 to user, for example by way of remote device 108 and/or a graphical user interface.

Still referring to FIG. 1, in some embodiments, system 100 may evaluate update data 148 using an evaluating machine learning model 156. As used in this disclosure, an "evaluating machine learning model" is a machine learning process that takes update data as input and generate evaluation results. Computing device 104 may input one or more of update data 148 and at least a user schedule 136 to an evaluating machine learning model 156. Computing device 104 may generate evaluation results 152 as a function of evaluating machine learning model 156. In some embodiments, system 100 may train evaluating machine learning model 152 using evaluating training data 160. As used in this disclosure, "evaluating training data" is a dataset that includes a plurality of update data correlated to evaluations. Update data and evaluations may be entered into evaluation training data manually, for example by an evaluation expert. In some cases, update data and evaluations may be derived for publications associated with a particular domain. Update data and evaluations may be derived from earlier instances of the system 100 or the system's operation with other users or with a same user associated with a different domain. In some cases, evaluating training data may include a plurality of update data and at least a domain correlated to evaluations. In some cases, an evaluation may be representative of an association between a domain status and a domain target. Computing device 104 may input evaluating training data 160 to a machine learning algorithm. Machine learning algorithm may include any machine learning algorithm, for example those disclosed with reference to FIGS. 4-7. Computing device 104 may train evaluating machine learning model 156 as a function of machine-learning algorithm.

Still referring to FIG. 1, in some embodiments, system 100 may notify user. For instance, system 100 may notify user as a function of evaluation results 152. In some cases, system 100 may notify user using remote device 108. System 100 may notify user by way of an application and/or a graphical user interface running on remote device. Alternatively or additionally, in some cases, remote device 108 may include text messaging capabilities and system 100 may notify user by way of a text message. As used in this disclosure, a "text message" is message communicated by way of one or more of short message service (SMS) and multimedia messaging service (MMS). Still referring to FIG. 1, in some embodiments, system 100 may allow a user to modify a schedule. For example, in some cases, a use schedule 136, which may be autogenerated, is not practical or otherwise acceptable to a user. In this case, a user may submit a schedule change request, for example from remote device 108. As used in this disclosure, a "schedule change request" is information that includes a modification to a user schedule. Computing device 104 may receive at least a schedule change request from user. Computing device 104 may modify at least a user schedule as a function of schedule change request. Exemplary, schedule change requests may include commands to change a time of a schedule component, change a location of a schedule component, change an invite list of a schedule component, change an event/activity of a schedule component, delete a schedule component, and add a schedule component. In some cases, a schedule change request may include a request to change a prioritization or inclusion of at least a domain 116a-n. In some cases, a schedule change request may cause a regeneration of user schedule 136, for example by using one or more machine learning processes (e.g., scheduling machine learning model 140). In some embodiments, notifying a user may include a notification on remote device. As used in this disclosure, a "notification" is an interrupting alarm, for example facilitated by background operation of a graphical user interface. In some cases, a notification may be first authorized by user, for example through use of remote device 'settings.' In some cases, notifications may be disabled to avoid disruption and/or interruption. As used in this disclosure, an "authorized notification" is a notification which has been authorized.

Still referring to FIG. 1, in some cases, system 100 may include a machine learning process configured to identify effective ways to motivate user. In some cases, machine learning process may include a trained machine learning model. In some cases machine learning model may be trained using training data correlating previous outputs (e.g., user schedule, domain targets, and the like) to subsequent updates for users generally. Alternatively or additionally, in some case, machine learning model may be trained using training data correlating previous outputs to updates for an individual user or a class (i.e., cohort) of similar users. In some cases, a cohort of users may be determined by a classifier. Classifier may include any classifier described in this disclosure, for example a clustering algorithm (e.g., K-means clustering algorithm, particle swarm optimization, and the like).

Referring now to FIG. 2, exemplary domains 200 are illustrated by way of a table. As can be seen domains may include vocational 204, marriage 208, family 212, health 216, virtue 220, emotional 224, financial 228, spiritual 232, intellectual 236, lifestyle 240, interest 244, and social 248 to name a few. Each domain 200 may have a status. Exemplary, non-limiting statuses include breakthrough, emerging, growth, plateau, stagnation, and depletion to name a few. In some cases, a domain status may be determined according to one or more state variables. State variable may be affected by objective data and/or subjective data. Exemplary non-limiting examples of objective data include medical measurements, time spent on certain activities, events participated in, number of steps taken, and generally speaking anything that can be measured. In some cases, remote device may directly measure or infer objective data, for example remote device may measure number of steps taken by user, amount of screen time, and the like. Alternatively or additionally objective data may be input by user into remote device. For example, a user may include user weight, user blood pressure, or any other objective datum by way of remote device. In some cases, user may input subjective data, for example by way of remote device. Subjective data may include a numerical representation (e.g., 1-10 rating) of how a user thinks or feels about a current aspect relating to a domain. For example a user may rate a level of anxiety, a level of fulfilment, or the like. In an embodiment, one or more domains may be selected and/or isolated by a user. This may allow for a more focused and concentrated experience on one or more domains of interest to a user. In an embodiment, a user may select one or more domains to isolate and/or focus on. In yet another non-limiting example, computing device 104 may select one or more domains for a user to focus on, using a selection process that may include one or more machine learning processes as described throughout this application.

With continued reference to FIG. 2, at least a domain may include vocational domain 204. Objective data that may be associated with vocational domain includes title, role, responsibility, compensation, and the like. Subjective data may include a rating of user's level of vocational fulfilment. A domain target associated with vocational domain 204 may include a change in a subjective or objective datum associated with the vocational domain 204. Schedule components or events that may be added to exploit value in vocational domain 204 include professional training events, maximizing contribution, exploiting opportunities, and the like.

With continued reference to FIG. 2, at least a domain may include marriage domain 208. Objective data that may be associated with marriage domain includes amount of time spent with spouse, for example time spent enjoying one another. Subjective data may include a rating of user's level of marriage fulfilment. A domain target associated with marriage domain 208 may include a change in a subjective or objective datum associated with the marriage domain 208. Schedule components or events that may be added to exploit value in marriage domain 208 include events determined to maximize marriage fulfilment, including participating in couple centric events, self-sacrificial acts of love, couples therapy, honest communication sessions, and the like.

With continued reference to FIG. 2, at least a domain may include family domain 212. Objective data that may be associated with family domain includes amount of time spent with family. Subjective data may include a rating of user's level of family fulfilment or a rating of a family member's level of fulfilment with user/spouse. A domain target associated with family domain 212 may include a change in a subjective or objective datum associated with the family domain 212. Schedule components or events that may be added to exploit value in family domain 212 include events determined to maximize family fulfilment, including participating in family events, self-sacrificing acts of love, generosity of time, money, and service, and the like.

With continued reference to FIG. 2, at least a domain may include health domain 216. Objective data that may be associated with health domain includes medical data, such as without limitation body mass index, blood pressure, resting heart rate, blood oxygen content, and the like. Subjective data may include a rating of user's level of health fulfilment, a rating of number of activities a user feels are impaired by health concerns, a rating of overall concern with health, and the like. A domain target associated with health domain 216 may include a change in a subjective or objective datum associated with the health domain 216. Schedule components or events that may be added to exploit value in health domain 216 include events determined to maximize health fulfilment, exercise, nutritional meals, visits to medical professionals, and the like.

With continued reference to FIG. 2, at least a domain may include virtue domain 208. Objective data that may be associated with virtue domain includes amount of time acting virtuously, proportion of big decisions which are aligned with desirable virtues, amount of success or failure living within targeted virtue levels, evidence of retained or unretained resolve, and the like. Subjective data may include a rating of user's self-perceived level of virtue or a rating of user's perceived level of virtue from another. A domain target associated with virtue domain 220 may include a change in a subjective or objective datum associated with the virtue domain 220. Schedule components or events that may be added to exploit value in virtue domain 220 include events determined to maximize virtue fulfilment, including participating habit building exercises designed to facilitate consistently good decision making.

With continued reference to FIG. 2, at least a domain may include emotional domain 224. Objective data that may be associated with emotional domain includes amount of time spent in a state of emotional destress, amount of time in emotional harmony, amount of time sleeping, caloric intake, amount of time engaged in anxiety about the past or imagined future, and the like. Subjective data may include a rating of user's level of emotional fulfilment. A domain target associated with emotional domain 224 may include a change in a subjective or objective datum associated with the emotional domain 224. Schedule components or events that may be added to exploit value in emotional domain 224 include therapy, treatment under the supervision of health care professionals, events and exercises that are likely to improve a user's emotions, and the like.

With continued reference to FIG. 2, at least a domain may include financial domain 228. Objective data that may be associated with financial domain includes amount of financial assets possessed by user. Subjective data may include a rating of user's sense of financial security independence and freedom. A domain target associated with financial domain 228 may include a change in a subjective or objective datum associated with the financial domain 228. Schedule components or events that may be added to exploit value in financial domain 228 include meeting with a financial advisor, increasing savings contributions, budgeting, and the like.

With continued reference to FIG. 2, at least a domain may include intellectual domain 236. Objective data that may be associated with intellectual domain includes amount performance in intellectual pursuits, such as graded performance in school. Subjective data may include a rating of user's level of intellectual fulfilment. A domain target associated with intellectual domain 236 may include a change in a subjective or objective datum associated with the intellectual domain 236. Schedule components or events that may be added to exploit value in intellectual domain 236 include events determined to maximize intellectual fulfilment, including enrolling in educational programs, enjoying cultural events, and the like.

With continued reference to FIG. 2, at least a domain may include lifestyle domain 240. Objective data that may be associated with lifestyle domain includes amount of time spent in ideal or unideal lifestyle settings. Subjective data may include a rating of user's level of lifestyle fulfilment. A domain target associated with lifestyle domain 240 may include a change in a subjective or objective datum associated with the lifestyle domain 240. Schedule components or events that may be added to exploit value in lifestyle domain 240 include events determined to maximize lifestyle fulfilment, including housing, travel, wardrobe, toys, activities, groups and free time.

With continued reference to FIG. 2, at least a domain may include interest domain 244. Objective data that may be associated with interest domain includes amount of time on avocational pursuits or personally enjoyable activities. Subjective data may include a rating of user's level of interest fulfilment. A domain target associated with interest domain 244 may include a change in a subjective or objective datum associated with the interest domain 244. Schedule components or events that may be added to exploit value in interest domain 244 include events determined to maximize interest fulfilment, including hobbyist events, and the like.

With continued reference to FIG. 2, at least a domain may include social domain 248. Objective data that may be associated with social domain includes amount of time spent with others in a social setting, for example time spent enjoying one another. Subjective data may include a rating of user's level of social fulfilment. A domain target associated with social domain 248 may include a change in a subjective or objective datum associated with the social domain 248. Schedule components or events that may be added to exploit value in social domain 248 include events determined to maximize social fulfilment, including participating in social events, engaging with a club, friends, groups, entertainment events, and the like.

Figure 3A:
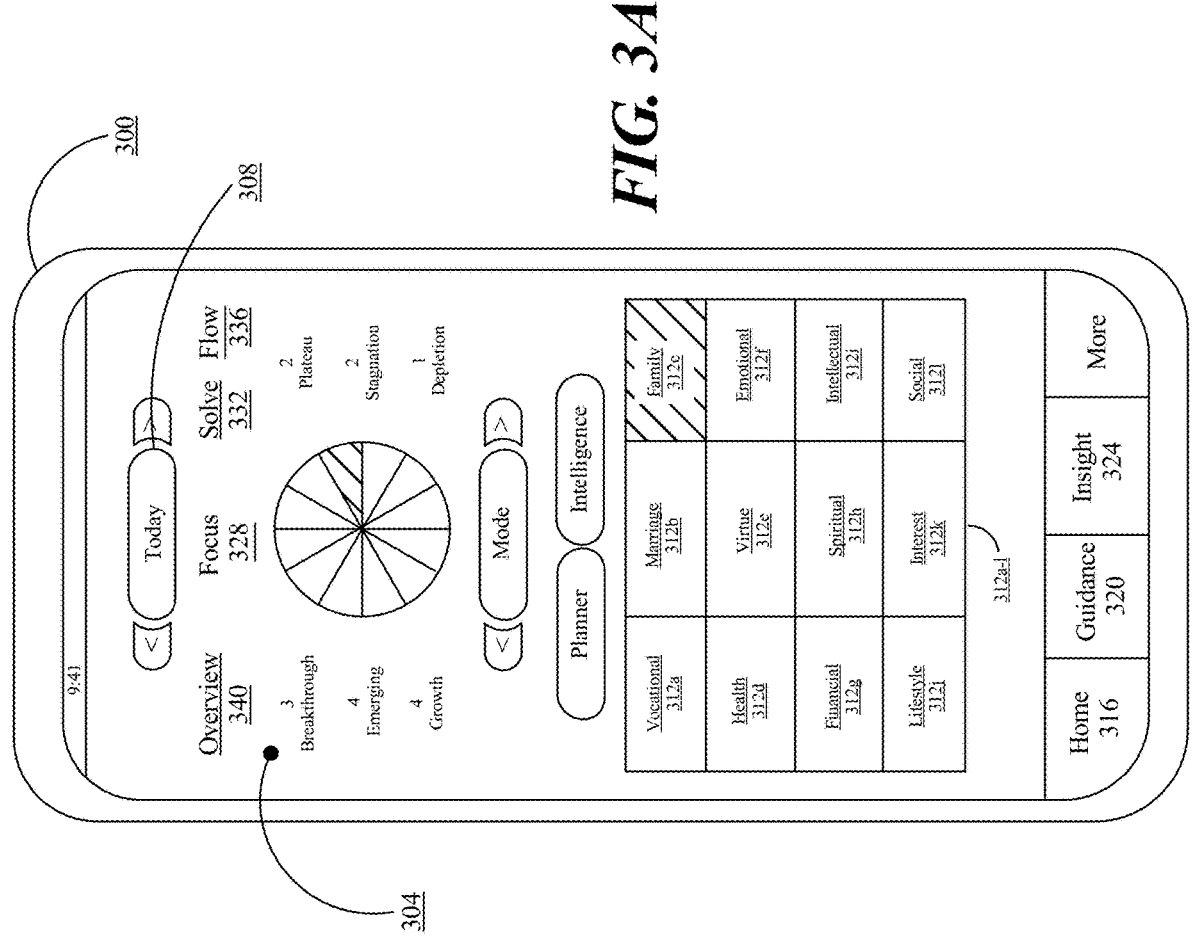
FIG. 3A is an exemplary remote device including an exemplary graphical user interface.

Referring now to FIG. 3A, an exemplary remote device 300 is illustrated. In some cases, remote device 300 may interface with user by way of a graphical user interface (GUI) 304. In some cases, remote device 300 may display to user a schedule 308, such as without limitation a weekly schedule. In some cases, schedule 308 function allows a user to view and edit a user schedule. In some cases, remote device 300 may display to user domains 312a-1. In some cases, progress (e.g., evaluation results) related to a domain may be represented by GUI, such as by way of color coding. For example, family domain 312c is indicated with hashmarks to indicate that family is an undesirable (e.g., depleted) status. In some cases, a status for each domain may be indicated to user by way of GUI 304, for example in an "Home" view 316. In some cases, GUI may allow user access to resources. In some cases, resources may be domain specific. Exemplary resources include guidance 320 and insight 324. Guidance 320 may include any audio information designed to enrich a user, for example within a specific domain. Insight 324 may include any media, such as video, text, and the like intended to enrich a user, for example within a specific domain. Focus 328 may isolate one or more domains that may aid in a more focused and concentrated experience to assist in driving change and progress. Solve 332 may include a scheduled focus for a particular period of time such as a day, week, month, quarter, year, and the like. Solve 332 may display information pertaining to particular issues and problems to solve and may aid in selecting one or more breakthrough domains. Flow 336 may include habits, projects, rocks, and to dos that may be aligned with a user's priorities and interests. Overview 340 may include a big picture view of domains, realms, and/or categories. Notebook 344 and/or intelligence 348 may include one or more digital copies of handwritten tools that may be integrated and automatically updated and available within graphical user interface 304.

Figure 3B:
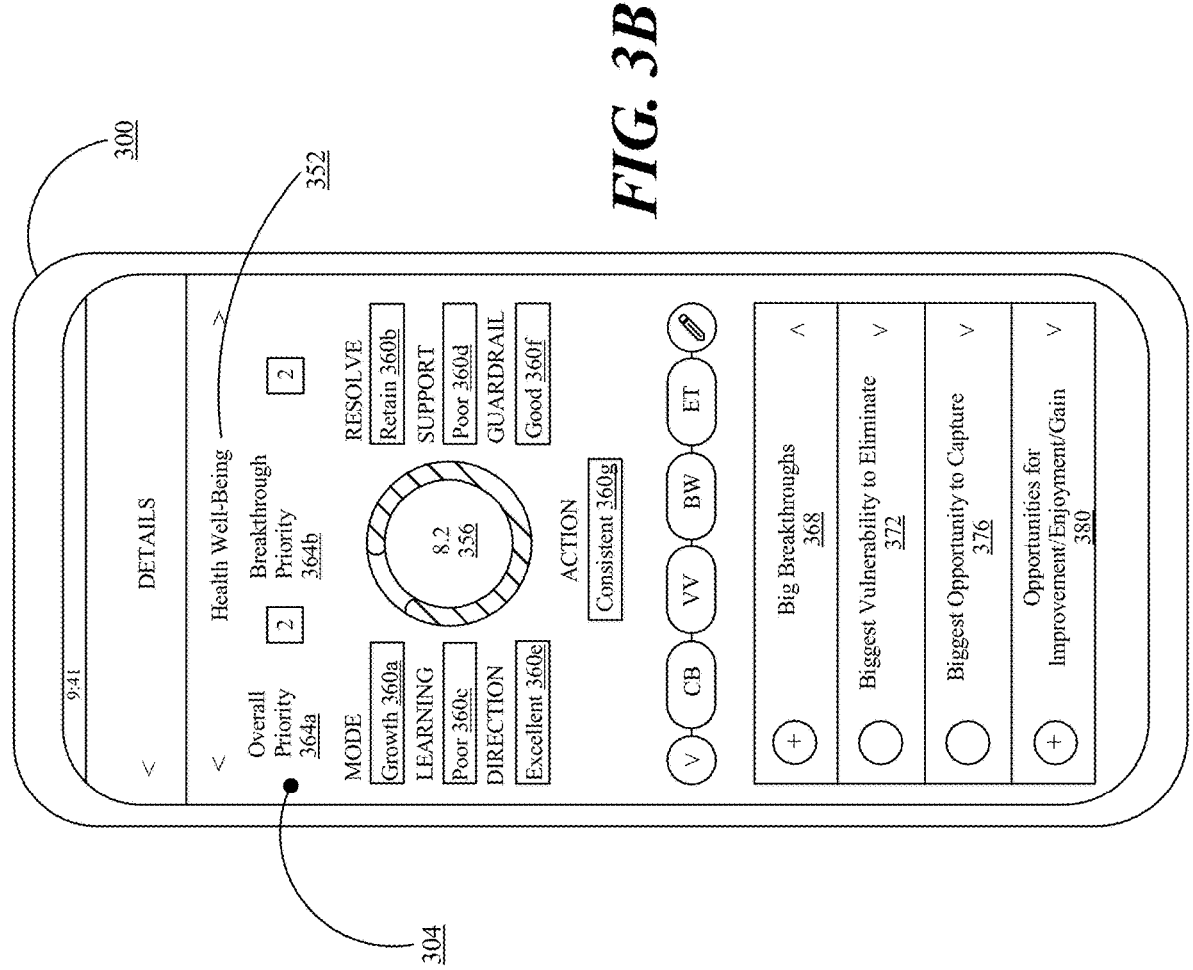
FIG. 3B is an exemplary remote device including an exemplary graphical user interface.

Referring now to FIG. 3B, an exemplary remote device 300 is illustrated. In some cases, remote device 300 may interface with user by way of a graphical user interface (GUI) 304. In some cases, remote device 300 may display domain-specific information 352, for instance information related to health domain. In some cases, an overall domain-specific rating 356 (i.e., evaluation result) may be presented to user. Additionally, subordinate domain-specific ratings (i.e., evaluation results) 360a-g may be presented to user. For example, subordinate domain-specific ratings may be related to mode 360a, resolve 360b, learning 360c, support 360d, direction 360e, guardrail 360f, action 360g, and the like. In some cases, a domain may be prioritize, for example with an overall priority 364a and/or a breakthrough priority 364b. In some cases, domain-specific information may be enumerated and/or prioritized. Exemplary enumerations and/or prioritizations include without limitation big breakthroughs 368, biggest vulnerability to eliminate 372, biggest opportunity to capture 376, opportunities for improvement/enjoyment/gain 380, and the like.

Figure 3D:
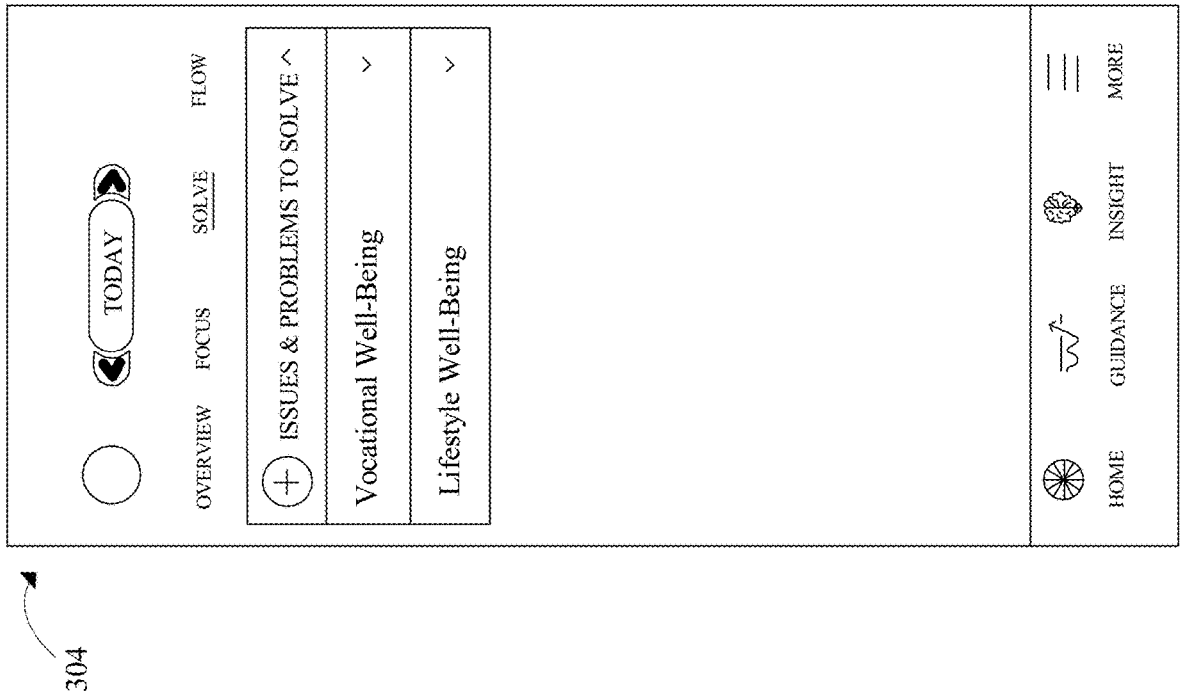
FIG. 3D is an exemplary remote device including an exemplary graphical user interface.

Referring now to FIGS. 3C and 3D, an exemplary remote device 300 display is illustrated. In some instances, remote device 300 may interface with user by way of a graphical user interface (GUI) 304. In some cases, remote device 300 may display suggestions such as "Habits/Productivity hacks," "Rocks," "Issues & Problems to Solve," or the like. Each suggestion category may include at least a domain with a respective drop-down menu option. In some instances, at least a domain may be color coded to indicate a domain-specific rating. As a non-limiting example, at least a domain may be a green shade if a respective domain-specific rating is above a certain threshold (e.g., 7.1). Further, at least a domain may be a yellow shade if a respective domain-specific rating is below a certain threshold (e.g., 7.0).

Continuing to refer to FIGS. 3C and 3D, at least a domain drop-down menu may include one or more recommendations and/or one or more suggestions associated with the suggestion category and the at least a domain. As a non-limiting example, a drop-down menu for "Vocational Well-Being" under the "Habits/Productivity Hacks" suggestion category may include habits and/or productivity hacks to improve a user's vocational well-being. Continuing the non-limiting example, habits and/or productivity hacks to improve the user's vocational well-being may include organizational suggestions, suggested modification to hours, prioritizing the user's work tasks based on predetermined importance, or the like.

Figure 4:
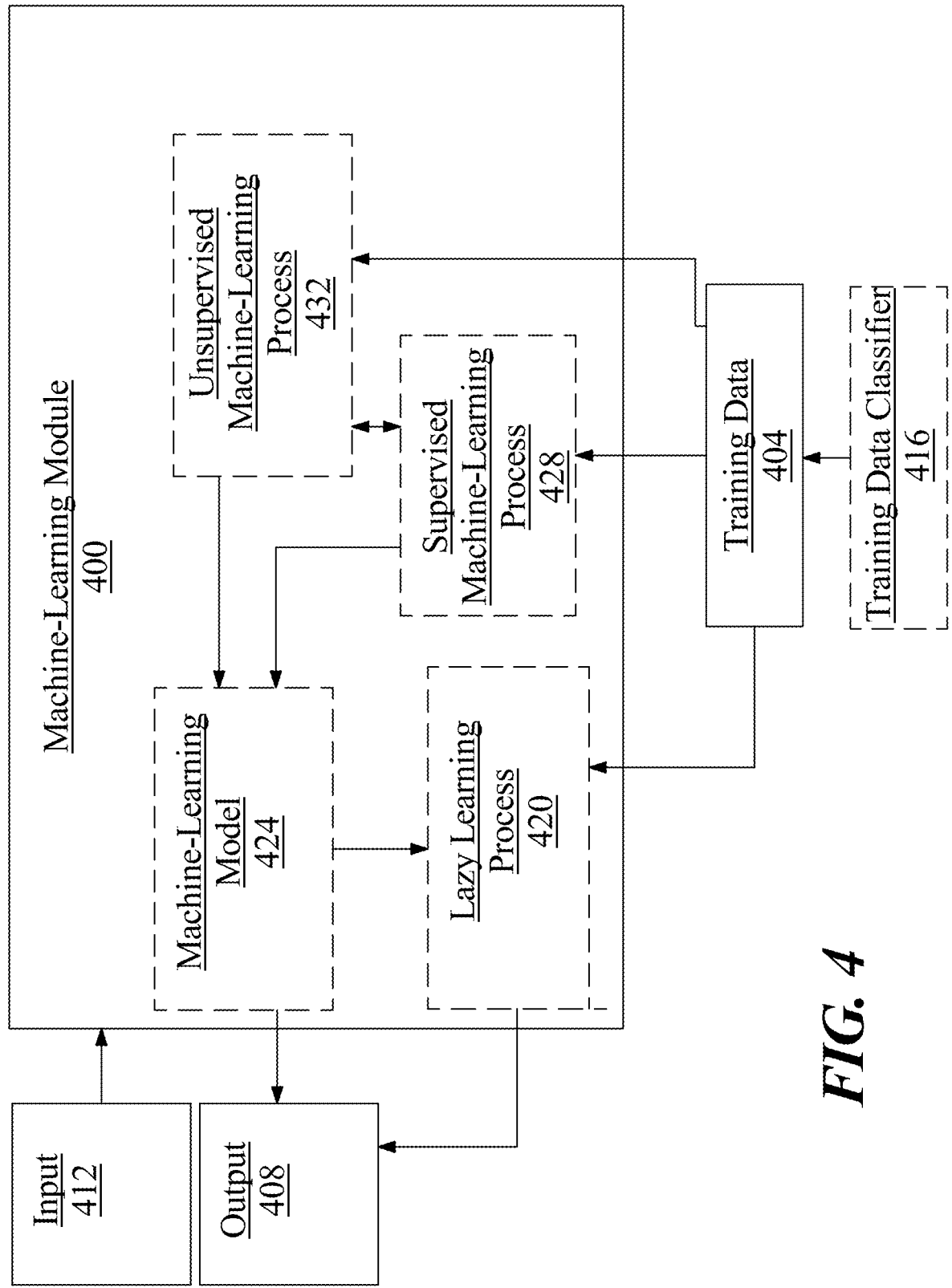
FIG. 4 is a block diagram illustrating exemplary machine learning processes.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example inputs may include domain-specific data and outputs may include correlated domain targets. Alternatively or additionally, inputs may include scheduling data and at least a domain target correlated to outputs that include schedule components or user schedules. Alternatively or additionally, inputs may include update data and/or domains correlated to evaluations.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to a particular domain, user, or user cohort. For example, in some cases, any machine-learning model described herein may be trained and/or retrained specifically with training data that is representative only of a particular domain, a particular user, or a cohort.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs as described above as inputs, outputs as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

With continued reference to FIG. 4, in some embodiments, machine-learning module 400 may be configured to perform automated planning and scheduling. In some cases, automated planning may require iterative processes, allowing feedback (e.g., user input, such as a scheduling change request) to affect planning. In some cases, a planner 400 may input a domain model (a description of a set of possible actions which model the domain) for a single domain as well as a specific problem to be solved specified by, for instance, by an initial state and a goal (e.g., domain target), in contrast to those in which there is no input domain or multiple input domains are specified. Such planners may be called domain independent, as they can solve planning problems from a wide range of domains. Typical examples of domains are described above in reference to FIG. 2. Hence a single domain-independent planner 400 can be used to solve planning problems in all domains and thereby generate a user schedule. In some cases, a maximum number of domains may be constrained by increased complexity in scheduling or planning. In some cases, status within at least a domain may be represented by one or more state variables. Each possible status of at least a domain may be represented by an assignment of values to state variables, and scheduled events (e.g., actions) may determine how the values of the state variables change when that planned schedule event occurs. As a set of state variables induce a state space that has a size that may grow exponentially, planning, and number of maximum number of domains may be constrained to avoid runaway complexity (e.g., dimensional complexity and combinatorial complexity). A number of algorithms and approaches may be used for automated planning.

With continued reference to FIG. 4, exemplary non-limiting approaches for planning include classical planning, reduction to other problems, temporal planning, probabilistic planning, preference-based planning, conditional planning (e.g., contingent planning and conformant planning), and the like. In some cases, classical planning may include a known initial state, deterministic events, non-simultaneous events, and events that are singularly attended to by user. A deterministic event may be expected to change a status (i.e., state variable) of a domain in a predictable way. In some cases, classical planning may include forward chaining state space search, backward chaining search, and partial-order planning. classical planning approaches may be, in some cases, enhanced and/or simplified with heuristics, state constraints, and the like.

With continued reference to FIG. 4, an automated planning algorithm may include a reduction to other problems. In some cases, a reduction to other problems may include reducing planning to a satisfiability problem (e.g., Boolean satisfiability problem). This may be referred to as Planning as Satisfiability (satplan). Exemplary non-limiting satplan algorithms include Davis-Putnam-Logemann-Loveland (DPLL) algorithm, GSAT, and WalkSAT. In some cases, reduction to other problems may include reduction to model checking. Model checking reduction to other problems may include traversing at least a state space and checking to ensure correctness against a given specification.

With continued reference to FIG. 4, an automated planning algorithm may include a temporal planning approach. In some cases, temporal planning can be solved with methods similar to classical planning. Temporal planning may additionally account for a possibility of temporally overlapping events or actions with a duration being taken concurrently. As a result, temporal planning algorithms may define a state to include information about a current absolute time and for how long each event has proceeded. Temporal planning may schedule plans relative rational or real time, or with integer time.

With continued reference to FIG. 4, an automated planning algorithm may include a probabilistic planning approach. Exemplary non-limiting methods of probabilistic planning may include Markov decision processes and/or partially observable Markov decision processes. In some case, probabilistic planning can be solved with iterative methods such as value iteration and policy iteration, for example when state space is sufficiently small. With partial observability, probabilistic planning may be similarly solved with iterative methods, but using a representation of value functions defined for space of beliefs instead of states.

With continued reference to FIG. 4, an automated planning algorithm may include preference-based planning. In preference-based planning, a schedule may be generated that satisfies user-specified preferences. For example, in some cases, a user may input preferences, such as a prioritization of one domain over another, a preference to have certain events at certain times, a preference for certain events to occur on different days, and the like. In some cases, a preference may have a numerical value. In which cases, a Markov Decision Processes (MDP) may be used (i.e., reward-based planning). Alternatively or additionally, in some cases, a user preference may not have a precise numerical value.

With continued reference to FIG. 4, an automated planning algorithm may include conditional planning. In some cases, conditional planning may include hierarchical planning, which may be compared with an automatic generated behavior tree. A normal behavior tree may allow for loops or if-then-statements. Conditional planning may overcome this and allow of these conditions within the automated planning process. In some cases, a planner 400 may synthesize a program, which may then be run in order to generate user schedule. Exemplary non-limiting conditional planner includes "Warplan-C." In some cases, conditional planning may allow for uncertainties during schedule generation. The schedule may then include different contingent events depending upon certain occurrences, such as without limitation user data, update data, and/or evaluation results. In some cases, a conditional planned 400 may generate partial plans or schedule components. In this cases, a conditional planner may determine what chunks or schedule components a schedule may be comprised of without forcing a complete plan or schedule of everything from start to finish. In some cases, this approach may help to reduce state space and solve much more complex problems, perhaps allowing for more domains to be considered during scheduling.

With continued reference to FIG. 4, in some cases conditional planning may include contingent planning. Contingent planning may be used when a user's status within a domain (i.e., domain status) may be observable by way of user data and/or update data. As user data and/or update data may provide only an incomplete or imperfect representation of domain status, planner may act incomplete information. For a contingent planning problem, a schedule may no longer be a sequence of events but a decision tree, as each step of the schedule may be represented by a set of states rather than a single perfectly observable state. Contingent planning may also be used when an effect an event will have on a domain state is not knowable a priori and is thus indeterminable. A selected event therefore may depend on state of domains or user. For example, if event fits schedule for Tuesday afternoon, then event will be Tuesday afternoon, otherwise event may be Thursday morning. A particular case of contiguous planning may be represented by fully-observable and non-deterministic (FOND) problems.

With continued reference to FIG. 4, in some cases, conditional planning may include conformant planning. Conformant planning may be employed when planner 400 is uncertain about state of domain or user and cannot make any observations. For example, between periods of update data. In this cases, planner 400 is unable to verify beliefs about user's status, for instance within at least a domain. In some cases, conformant planning may proceed similar to methods for classical planning. Exemplary non-limiting computer languages for planning include Stanford Research Institute Problem Solver (STRIPS), graphplan, Planning Domain Definition Language (PDDL), and Action Description Language (ADL). An alternative language for describing planning problems may include hierarchical task networks, in which a set of tasks may be given. In some cases, each task can be either realized by a primitive action or event or decomposed into a set of other tasks. In some cases, a hierarchical task network may not involve state variables, although in some cases state variables may be used and may simplify description of task networks.

Figure 5:
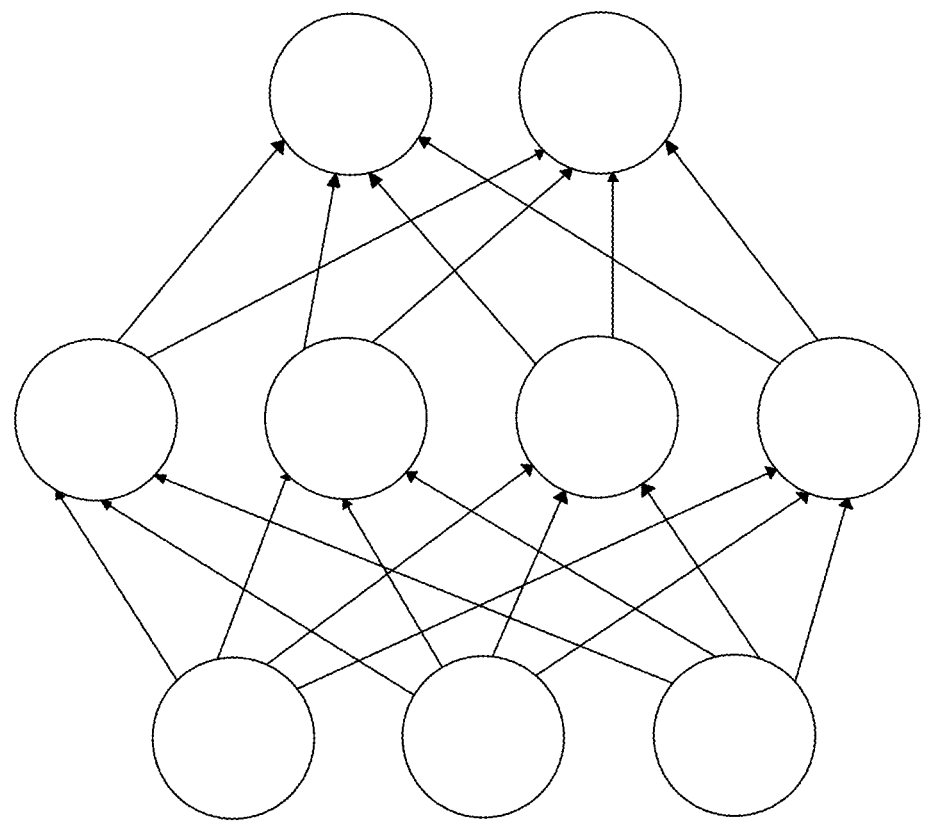
FIG. 5 is a block diagram illustrating an exemplary nodal network.

Referring now to FIG. 5, an exemplary embodiment of neural network 500, for example a feed-forward network, is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 6:
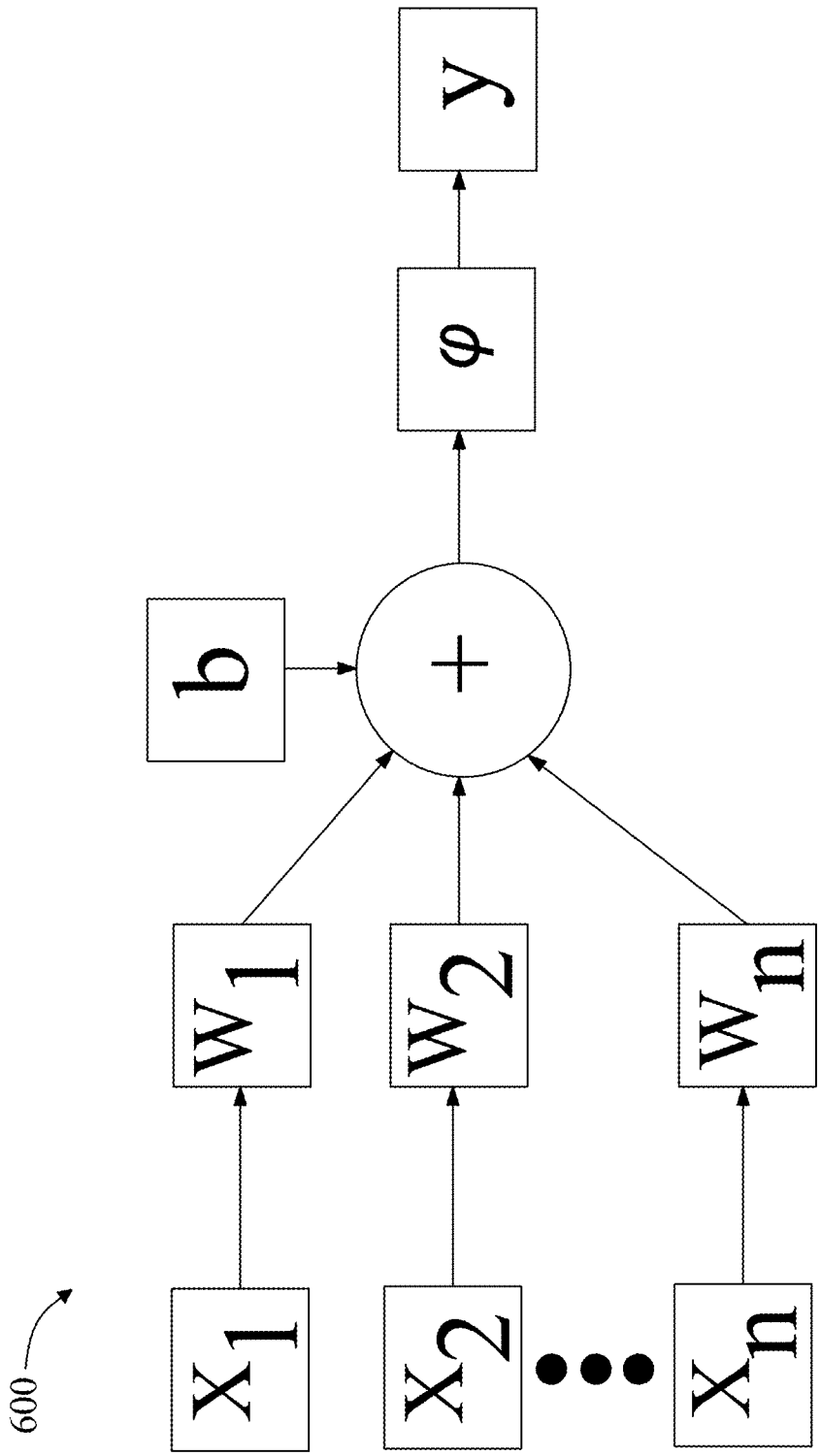
FIG. 6 is a block diagram illustrating an exemplary node.

Referring now to FIG. 6, an exemplary embodiment 600 of a node of a neural network is illustrated. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Referring again to FIG. 1, In some embodiments, computing device 104 may be configured to modify a training set in response to user data, update data, and/or a scheduling change request. For example, computing device 104 may, in some cases, retrain a machine-learning model, for instance target-setting machine learning model 128, scheduling machine-learning model 140, and/or evaluating machine-learning model 156. In some embodiments, computing device 104 may be configured to classify at least domain target 124a-n and determine a confidence metric. For example, in some exemplary embodiments confidence metric may be a floating-point number within a prescribed range, such as without limitation 0 to 1, with each end of the prescribed range representing an extreme representation, such as without limitation substantially no confidence and substantially absolute confidence, respectively. In some cases, confidence metric may represent a relationship between a result of filtering and/or classifying at least a domain target 124a-n. Confidence metric may be determined by one more comparisons algorithms, such as without limitation a fuzzy set comparison. For example, in some exemplary embodiments a fuzzy set comparison may be employed to compare domain specific data 120a-n with a membership function derived to represent at least a domain target 124a-n for classification.

Figure 7:
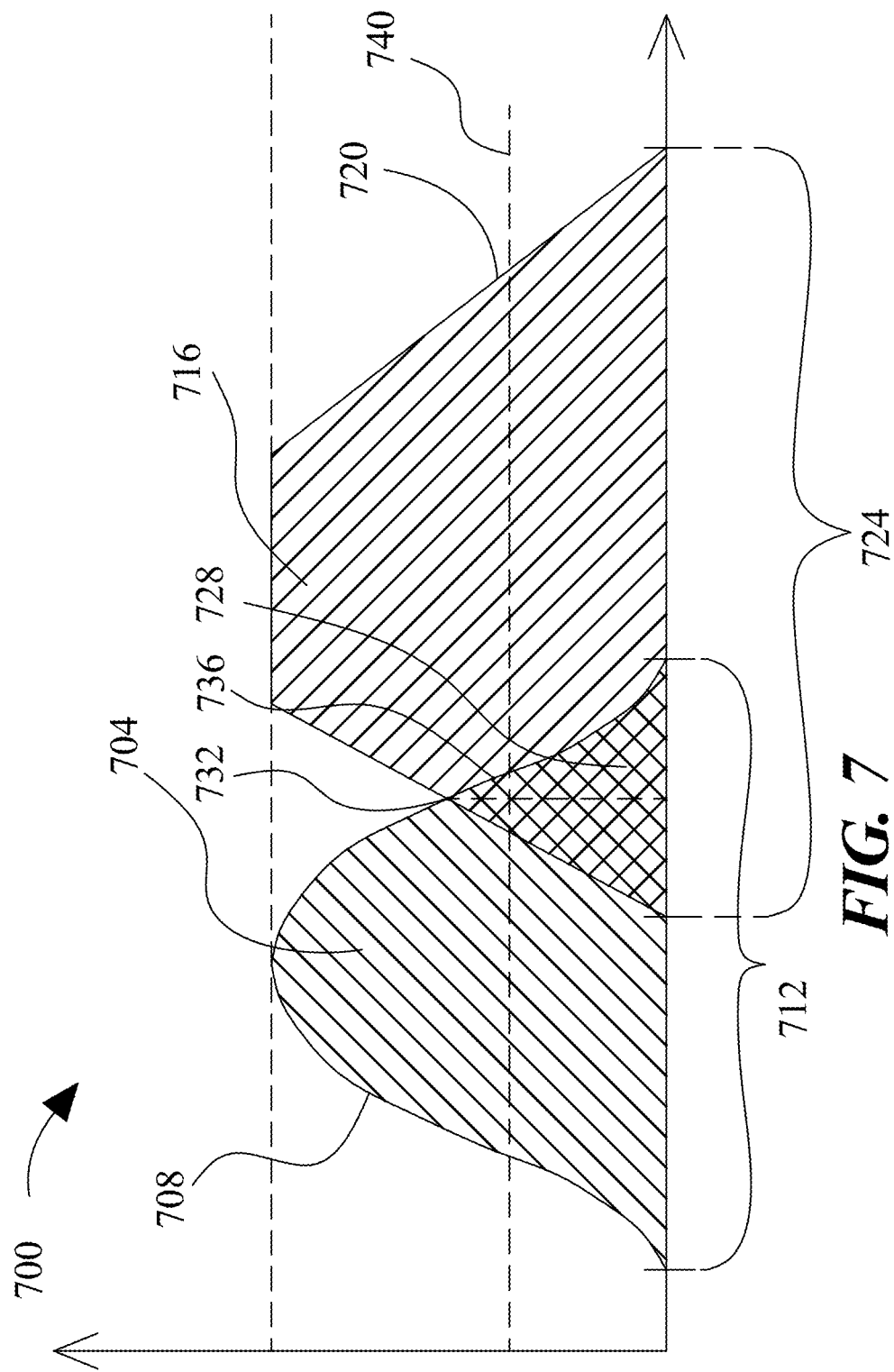
FIG. 7 is a block diagram illustrating exemplary fuzzy sets.

Referring to FIG. 7, an exemplary embodiment of fuzzy set comparison 700 is illustrated. A first fuzzy set 704 may be represented, without limitation, according to a first membership function 708 representing a probability that an input falling on a first range of values 712 is a member of the first fuzzy set 704, where the first membership function 708 has values on a range of probabilities such as without limitation the interval [0,1], and an area beneath the first membership function 708 may represent a set of values within first fuzzy set 704. Although first range of values 712 is illustrated for clarity in this exemplary depiction as a range on a single number line or axis, first range of values 712 may be defined on two or more dimensions, representing, for instance, a Cartesian product between a plurality of ranges, curves, axes, spaces, dimensions, or the like. First membership function 708 may include any suitable function mapping first range 712 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \le x < b \\ \frac{c-x}{c-b}, \text{ if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure. Still referring to FIG. 7, first fuzzy set 704 may represent any value or combination of values as described above, including output from one or more machine-learning models and user data from remote device 108, a predetermined class, such as without limitation a domain status and/or a domain target. A second fuzzy set 716, which may represent any value which may be represented by first fuzzy set 704, may be defined by a second membership function 720 on a second range 724; second range 724 may be identical and/or overlap with first range 712 and/or may be combined with first range via Cartesian product or the like to generate a mapping permitting evaluation overlap of first fuzzy set 704 and second fuzzy set 716. Where first fuzzy set 704 and second fuzzy set 716 have a region 728 that overlaps, first membership function 708 and second membership function 720 may intersect at a point 732 representing a probability, as defined on probability interval, of a match between first fuzzy set 704 and second fuzzy set 716. Alternatively or additionally, a single value of first and/or second fuzzy set may be located at a locus 736 on first range 712 and/or second range 724, where a probability of membership may be taken by evaluation of first membership function 708 and/or second membership function 720 at that range point. A probability at 728 and/or 732 may be compared to a threshold 740 to determine whether a positive match is indicated. Threshold 740 may, in a non-limiting example, represent a degree of match between first fuzzy set 704 and second fuzzy set 716, and/or single values therein with each other or with either set, which is sufficient for purposes of the matching process; for instance, threshold may indicate a sufficient degree of overlap between an output from one or more machine-learning models and/or user data from remote device 108 and a predetermined class, such as without limitation a domain status and/or domain target, for combination to occur as described above. Alternatively or additionally, each threshold may be tuned by a machine-learning and/or statistical process, for instance and without limitation as described in further detail below.

Further referring to FIG. 7, in an embodiment, a degree of match between fuzzy sets may be used to classify. For instance, if a domain-specific data has a fuzzy set matching a domain target fuzzy set by having a degree of overlap exceeding a threshold, computing device 104 may classify the domain-specific data as belonging to the domain target. Where multiple fuzzy matches are performed, degrees of match for each respective fuzzy set may be computed and aggregated through, for instance, addition, averaging, or the like, to determine an overall degree of match.

Figure 8:
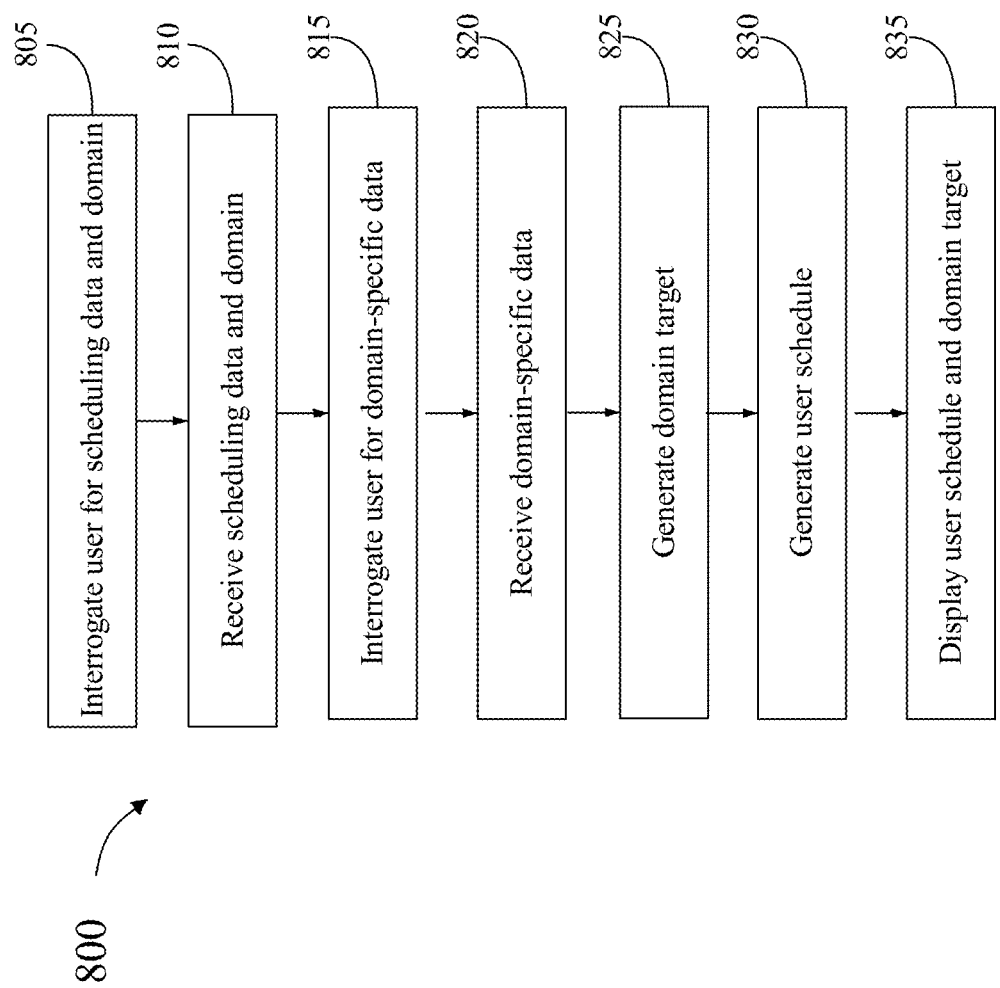
FIG. 8 is a flow diagram of an exemplary method of exploiting value in certain domains.

Referring now to FIG. 8, a method 800 of exploiting value within certain domains is illustrated by way of a flow diagram. At step 805, method 800 may include interrogating a user for scheduling data and at least a domain. User may include any user described in this disclosure, for example including with reference to FIGS. 1-7. Scheduling data may include any scheduling described in this disclosure, for example including with reference to FIGS. 1-7. Domain may include any domain described in this disclosure, for example including with reference to FIGS. 1-7. In some cases, at least a domain may include at least one domain and no more than a predetermined maximum number of domains.

With continued reference to FIG. 8, at step 810, method 800 may include receiving scheduling data and at least a domain from the user.

With continued reference to FIG. 8, at step 815, method 800 may include interrogating user for domain-specific data associated with at least a domain. Domain-specific data may include any domain-specific data described in this disclosure, for example including with reference to FIGS. 1-7. In some embodiments, at least a domain target may include a quarterly target.

With continued reference to FIG. 8, at step 820, method 800 may include receiving domain-specific data from user.

With continued reference to FIG. 8, at step 825, method 800 may include generating at least a domain target for at least a domain as a function of domain-specific data. Domain target may include any domain target described in this disclosure, for example including with reference to FIGS. 1-7. In some embodiments, step 825 may additionally include inputting domain-specific data to a target-setting machine learning model and generating at least a domain target as a function of the domain-specific data and the target-setting machine learning model. Target-setting machine learning model may include any machine-learning process described in this disclosure, including with reference to FIGS. 1-7. In some embodiments, method 800 may additionally include training target-setting machine learning model. In some cases, training target-setting machine learning model includes inputting target-setting training data to a machine learning algorithm and training the target-setting machine learning model as a function of the machine-learning algorithm. Target-setting training data may include any training data described in this disclosure, for example with reference to FIGS. 1-7. In some cases, target-setting training data includes a plurality of domain-specific data correlated to a domain target.

With continued reference to FIG. 8, at step 830, method 800 may include generating at least a user schedule as a function of at least a domain target and scheduling data. User schedule may include any user schedule described in this disclosure, for example including with reference to FIGS. 1-7. In some embodiments, step 830 may additionally include inputting at least a domain target and scheduling data to a scheduling machine learning model and generating at least a user schedule as a function of the scheduling machine learning model. Scheduling machine learning model may include any machine learning model described in this disclosure, including with reference to FIGS. 1-7. In some embodiments, method 800 may additionally include training scheduling machine learning model. In some cases, training scheduling machine learning model may include inputting scheduling training data to a machine learning algorithm and training the scheduling machine learning model as a function of the machine-learning algorithm. Scheduling training data may include any training data described in this disclosure, including with reference to FIGS. 1-7. In some cases, wherein scheduling training data may include a plurality of domain targets correlated to schedule components. In some embodiments, at least a user schedule includes a weekly schedule.

With continued reference to FIG. 8, at step 835, method 800 may include displaying at least a user schedule and at least a domain target to the user.

Still referring to FIG. 8, in some embodiments, method 800 may additionally include interrogating user for update data, evaluating the update data as a function of at least a user schedule, and displaying evaluation results to the user. In some cases, update data may include objective update data. In some cases, update data may include subjective update data. In some embodiments, evaluating update data may include inputting the update data and at least a user schedule to an evaluating machine learning model, and generating evaluation results as a function of the evaluating machine learning model. Evaluating machine learning model may include any machine learning process described in this disclosure, including with reference to FIGS. 1-7. In some embodiments, method 800 may additionally include training evaluating machine learning model. In some cases, training evaluating machine learning model may include inputting evaluating training data to a machine learning algorithm and training the evaluating machine learning model as a function of the machine-learning algorithm. Evaluating training data may include any training data described in this disclosure, including with reference to FIGS. 1-7. In some cases, evaluating training data may include a plurality of update data correlated to evaluations. In some embodiments, method 800 may additionally include notifying user as a function of evaluation results. In some cases, notifying user may include a text message. In some cases, notifying a user may include an authorized notification.

Still referring to FIG. 8, in some embodiments, method 800 may additionally include receiving at least a schedule change request from user and modifying at least a user schedule as a function of the schedule change request.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed:

1. A method of exploiting value within a certain domain, the method comprising:
    interrogating, by a computing device, a remote device associated with a user for:
        scheduling data;
        at least a domain, wherein a quantity of domains in the at least a domain is between one and a predetermined maximum number of domains selected by the user; and
        domain-specific data, wherein the domain-specific data is a function of the at least a domain;
    receiving, by the computing device and from the remote device, the scheduling data, the at least a domain, and the domain-specific data;
    generating, by the computing device, at least a domain target for the at least a domain as a function of the domain-specific data and a target-setting machine learning model, wherein generating the at least a domain target for the at least a domain comprises:
        receiving target-setting training data, wherein the target-setting training data correlates a plurality of domain-specific data to a domain target, wherein the target-setting training data is filtered into categories by a target-setting training data classifier;
        applying the target-setting training data to an input layer of nodes comprising the at least domain-specific data input, one or more intermediate layers of nodes, and an output layer of nodes comprising update data and a user schedule correlating to at least a domain target;
        training the target-setting machine learning model as a function of the target-setting training data;
        generating the at least domain target for the at least the domain as a function of the target-setting machine learning model;
        updating the target-setting training data as a function of the domain-specific data, domain target data and the at least a domain target; and
        iteratively training the target-setting machine learning model as a function of updating the target-setting training data;
    training, by the computing device, a schedule machine learning model using scheduling training data configured to correlate the at least a domain target generated as a function of the target-setting machine learning model to at least a user schedule;
    generating, by the computing device, the at least a user schedule as a function of the schedule machine learning model, wherein generating the at least a user schedule comprises:
        receiving a status of the at least a domain;
        assigning one or more state variables to the at least a domain, wherein the one or more state variables represent the status of the at least a domain;
        generating the at least a user schedule as a function of the one or more state variables; and
    displaying, by the computing device and at the remote device, the at least a user schedule and the at least a domain target to the user.

2. The method of claim 1, wherein assigning one or more state variables to the at least a domain further comprises determining an initial state of the at least a domain.

3. The method of claim 2, wherein the initial state of the at least a domain corresponds to a specific problem.

4. The method of claim 2, wherein generating the at least a user schedule further comprises comparing the at least a domain target to the initial state of the at least a domain.

5. The method of claim 1, further comprising receiving, by the computing device, update data.

6. The method of claim 5, wherein the update data includes one or more changes to the one or more state variables.

7. The method of claim 1, wherein the one or more state variables forms a set of state variables.

8. The method of claim 7, wherein the set of state variables limits a quantity of domains.

9. The method of claim 1, wherein the one or more state variables are a function of subjective data.

10. The method of claim 1, wherein the one or more state variables are a function of objective data.

11. A system for exploiting value within a certain domain, the system comprising a computing device configured to:
    interrogate a remote device associated with a user for:
        scheduling data;
        at least a domain, wherein a quantity of domains in the at least a domain is between one and a predetermined maximum number of domains selected by the user; and
        domain-specific data, wherein the domain-specific data is a function of the at least a domain;
    receive, from the remote device, the scheduling data, the at least a domain, and the domain-specific data and a target-setting machine learning model, wherein generating the at least a domain target for the at least a domain comprises:
        receiving target-setting training data, wherein the target-setting training data correlates a plurality of domain-specific data to a domain target, wherein the target-setting training data is filtered into categories by a target-setting training data classifier;
        applying target-setting training data to an input layer of nodes comprising the at least domain-specific data input, one or more intermediate layers of nodes, and an output layer of nodes comprising update data and a user schedule correlating to at least a domain target;
        training the target-setting machine learning model as a function of the target-setting training data;
        generating the at least domain target for the at least the domain as a function of the target-setting machine learning model;
        updating the target-setting training data as a function of the domain-specific data, domain target data and the at least a domain target; and
        iteratively training the target-setting machine learning model as a function of updating the target-setting training data;
    training, by the computing device, a schedule machine learning model using scheduling training data configured to correlate the at least a domain target generated as a function of the target-setting machine learning model to at least a user schedule;
    generate, by the computing device, the at least a user schedule as a function of the schedule machine learning model, wherein generating the at least a user schedule comprises:
        receiving a status of the at least a domain;

assigning one or more state variables to the at least a domain, wherein the one or more state variables represent the status of the at least a domain;

generating the at least a user schedule as a function of the one or more state variables; and display, at the remote device, the at least a user schedule and the at least a domain target to the user.

12. The system of claim 11, wherein assigning one or more state variables to the at least a domain further comprises determining an initial state of the at least a domain.

13. The system of claim 12, wherein the initial state of the at least a domain corresponds to a specific problem.

14. The system of claim 12, wherein generating the at least a user schedule further comprises comparing the at least a domain target to the initial state of the at least a domain.

15. The system of claim 11, wherein the computing device is further configured to receive update data.

16. The system of claim 15, wherein the update data includes one or more changes to the one or more state variables.

17. The system of claim 11, wherein the one or more state variables forms a set of state variables.

18. The system of claim 17, wherein the set of state variables limits a quantity of domains.

19. The system of claim 11, wherein the one or more state variables are a function of objective data.

20. The system of claim 11, wherein the one or more state variables are a function of subjective data.

* * * * *